United States Patent [19]

Barnes

[11] Patent Number: 5,744,218
[45] Date of Patent: Apr. 28, 1998

[54] LAMINATED PANEL WITH AN EMBEDDED WIRING HARNESS

[76] Inventor: Jim Barnes, 6090 Fall Creek Rd., Indianapolis, Ind. 46220

[21] Appl. No.: 636,318

[22] Filed: Apr. 23, 1996

[51] Int. Cl.6 .................................................. B32B 3/02
[52] U.S. Cl. .................. 428/192; 428/222; 174/72 A; 174/69
[58] Field of Search ....................... 428/192, 222; 174/72 A, 69

[56] References Cited

U.S. PATENT DOCUMENTS

| | | |
|---|---|---|
| 2,768,026 | 10/1956 | Stephens et al. |
| 4,119,794 | 10/1978 | Matsuki |
| 4,840,832 | 6/1989 | Weinle et al. |
| 4,874,908 | 10/1989 | Johansson ............................ 174/72 A |
| 5,016,934 | 5/1991 | Pelz |
| 5,082,716 | 1/1992 | Satterfield et al. |
| 5,089,328 | 2/1992 | Doerer et al. |
| 5,269,060 | 12/1993 | Dowd et al. |
| 5,309,634 | 5/1994 | Van Order et al. |

Primary Examiner—Marion E. McCamish
Assistant Examiner—Elizabeth M. Cole
Attorney, Agent, or Firm—Liell & McNeil

[57] ABSTRACT

A method of making a laminated panel with an embedded wiring harness begins with the steps of providing at least two separate layers of material and a length of wire. A portion of the wire is deformed into a circuitous pattern that results in a deformed wire with a length significantly shorter than the original undeformed length of wire. The wire is then positioned between the layers of material, which are then laminated together into a laminate. The laminate is then cut into a shaped laminated panel with the deformed wire being adjacent the cut edge of the panel. Finally, the deformed wire is pulled away from the cut edge of the laminated panel and used as an electrical lead for attachment to a power source, antenna or some electrical device.

4 Claims, 3 Drawing Sheets

SECTION X — X

SECTION Z - Z

LAMINATED PANEL WITH AN EMBEDDED WIRING HARNESS

TECHNICAL FIELD

The present invention relates generally to laminated panels, and more particularly to a laminated panel with an embedded wiring harness.

BACKGROUND ART

This invention relates to the production of electrified panels used in vehicles, furniture, office partitions and/or appliances. More specifically it applies to the idea and process of embedding wiring in panels during manufacturing in such a way that the wire can be accessed later. The wiring can be accessed immediately or accessed after being shipped to another location. Finally, the wiring can be used for both power and signal applications, i.e. radio antennas.

The traditional manufacturing and attachment of wiring on panels is a labor intensive and cumbersome process that creates handling allowances for factory workers and assembly equipment. Traditional panels combined with today's assembly process can result in quality problems, field failures and customer dissatisfaction. By capturing all wire within the panel during manufacture, the likelihood of unnecessary breakage or stressing of exposed wire or wire branches is substantially lessened. Later in assembly plants, handling can effectively be improved through more flexible and opportune means since the possibility of wire becoming untaped, unglued or dislodged from a channel in a panel is eliminated. Typically, in the final installation of an electrified panel, no wire is exposed to structural members where cut through or abrasion is a concern. In applications involving potential vibrations, the capsulated wires will not pull loose from tack points or dislodge from channels causing unwanted equipment or vehicle noise.

In U.S. Pat. No. 5,309,634 to Van Order et al., a laminated panel is shown with conductive strips or wires embedded therein. The conductors are positioned between dielectric layers when the panel is molded. The reference teaches the idea of cutting apertures in the panel after it is formed, but does not explain how this process avoids cutting the conductive strips or wires. Apparently, Van Order et al. assumes that water knives will not cut through the conductive elements. This reveals a flaw in Van Order et al., since it is extremely difficult to control water knives to have the ability to cut through a laminated panel yet leave wires embedded therein intact for later use. Thus, accidental cutting of embedded wires inevitably renders the Van Order et al. invention unsuitable for mass production.

U.S. Pat. No. 5,016,934 to Pelz teaches another method of embedding electrical conductors in a laminated panel headliner for a motor vehicle. Pelz teaches the idea of including conductive layers that are separated from one another and the outer surface of the laminate by being positioned between two non-conductive layers. Pelz also shows the idea of including a grid of positive and negative conductors on opposite sides of an insulating layer. Similar to Van Order et al., Pelz suffers from difficulties in exposing conductors after the laminated panel is cut. Furthermore, Pelz appears to require all electrical devices attached to the panel to be operated in parallel to one another.

The present invention is directed to overcoming these and other problems associated with the attachment of wiring to laminated panels.

SUMMARY OF THE INVENTION

A method of making a laminated panel with an embedded wiring harness includes the initial step of providing at least two separate layers of material and a length of wire. A portion of the wire is deformed into a circuitous pattern that results in a deformed wire with a length significantly shorter than the length of the undeformed wire. The deformed wire is position between the layers of material. The layers of material are then laminated to one another to form a laminate. The laminate is then cut into a shaped laminated panel with a portion of the deformed wire being exposed adjacent the cut edge of the laminated panel. Finally, a portion of the deformed wire is pulled away and exposed adjacent the cut edge of the laminated panel.

In another embodiment of the invention, a laminated panel with an embedded wiring harness includes a length of wire with a portion deformed into a circuitous pattern and a plurality of layers of material. The length of wire is positioned between the plurality of layers of material which are laminated together into a laminate and cut to include an edge boundary. A portion of the wire deformed in the circuitous pattern is exposed at the edged boundary and is capable of further deformation to extend a segment of the length of wire away from the edge boundary of the laminate.

One object of the present invention is to improve the manufacture of electrified laminated panels.

Another object of the present invention is to provide a method of embedding wiring harnesses into laminated panels for a wide variety of uses.

Still another object of the present invention is to eliminate manufacturing steps in the making of electrified laminated panels for motor vehicles, especially headliners.

BEST MODE FOR CARRYING OUT THE INVENTION

Figure 1:
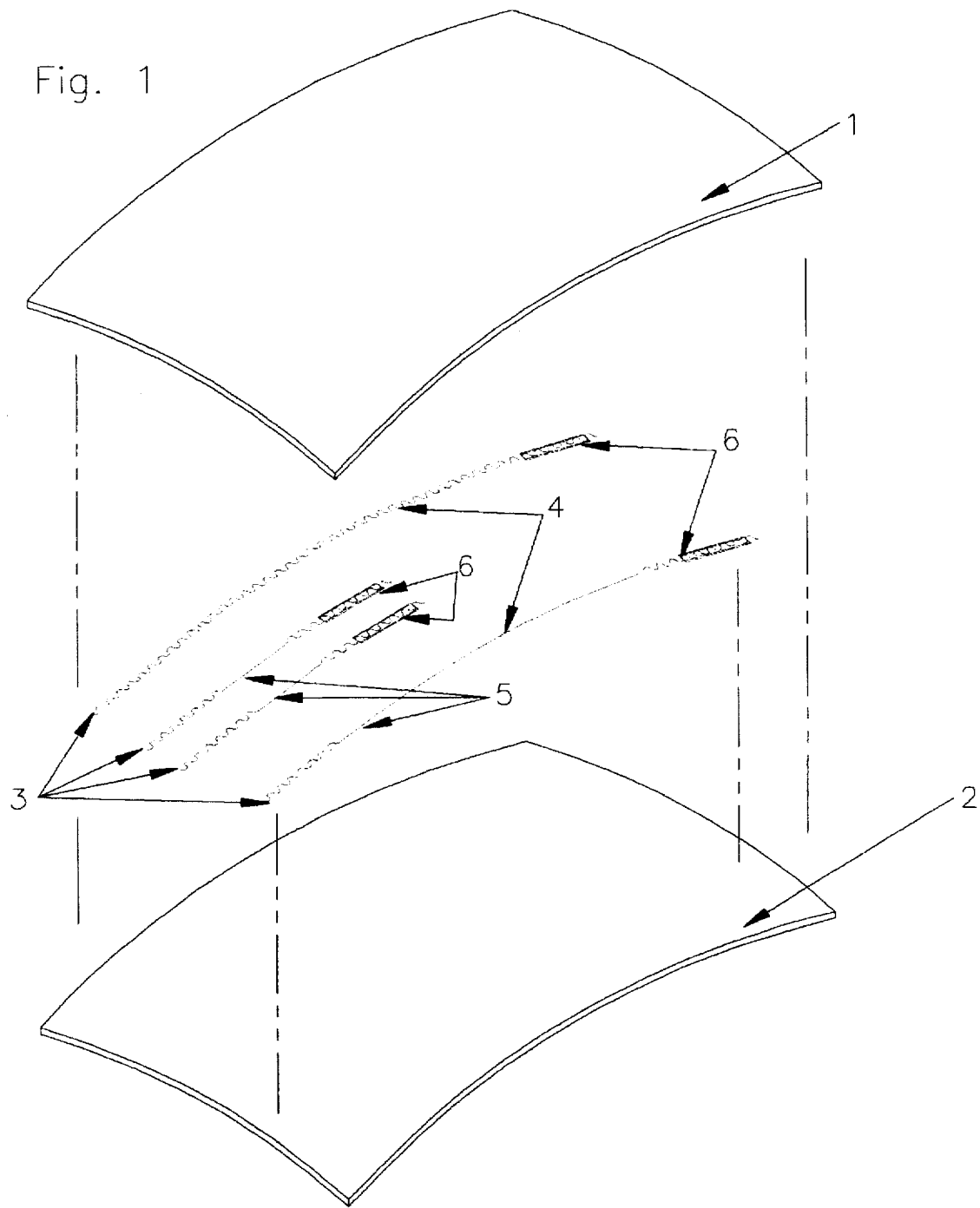
FIG. 1 is an isometric view of the various components that go into making a laminated panel with an embedded wiring harness according to one embodiment of the present invention.

Referring now to FIG. 1, a plurality of separate wire segments 3 are shown positioned between a first layer of material 1 and a second layer of material 2. Those skilled in the art will appreciate that although only two layers of material are shown, many laminated panels often utilize many layers. For instance, the reader is referred to U.S. Pat. No. 5,089,328 to Doerer et al. which shows a panel and a method of making the same that includes ten or more individual layers. Thus, the present invention could be practiced with multi-layer laminates, but in its simplest form, only two separate layers of material are required.

Before being formed to include a circuitous pattern over a portion of their respective lengths, each of the wires was substantially straight, as in segments 5 shown. Thus, as part of the present invention, a straight length of wire is formed to include a circuitous pattern over a portion of its length such that the deformed wire has a length significantly shorter than the length of undeformed wire. The circuitous pattern shown is a regular repeating wave pattern that is free of overlapping wire segments. Nevertheless, other circuitous patterns could be utilized in relation to the present invention, including, but not limited to, a zig zag pattern or a coiled pattern that includes overlapping wire segments. Each of the lengths of wire 3 can be insulated or laid bare depending upon what the wire is being used for (i.e. signal or power) and other factors known to those skilled in the art.

Figure 2:
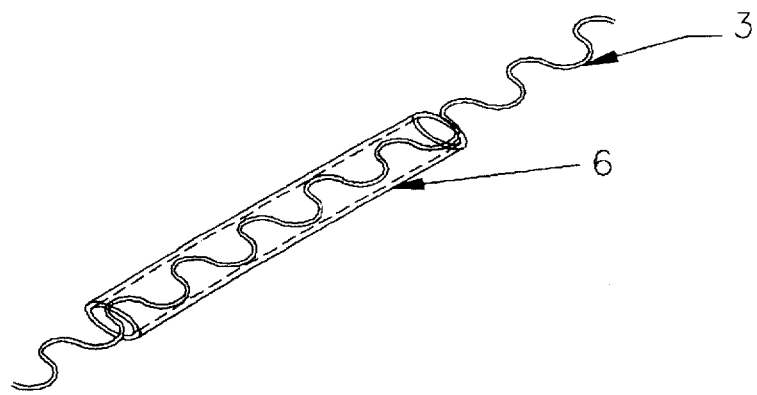
FIG. 2 is an isometric view of a segment of wire formed into a circuitous pattern and partially surrounded by a sleeve according to one aspect of the present invention.

It should also be noted that a segment of each deformed wire 3 is preferably covered by a sleeve 6. Sleeve 6 is made from any suitable material such as, paper or a suitable plastic that resists melting and/or attachment to itself or the wire when the various components undergo a laminating process, which likely includes relatively extreme heat and pressure. FIG. 2 shows a close up view of a deformed wire segment 3 having a sleeve positioned over a portion of the wire.

Figure 3:
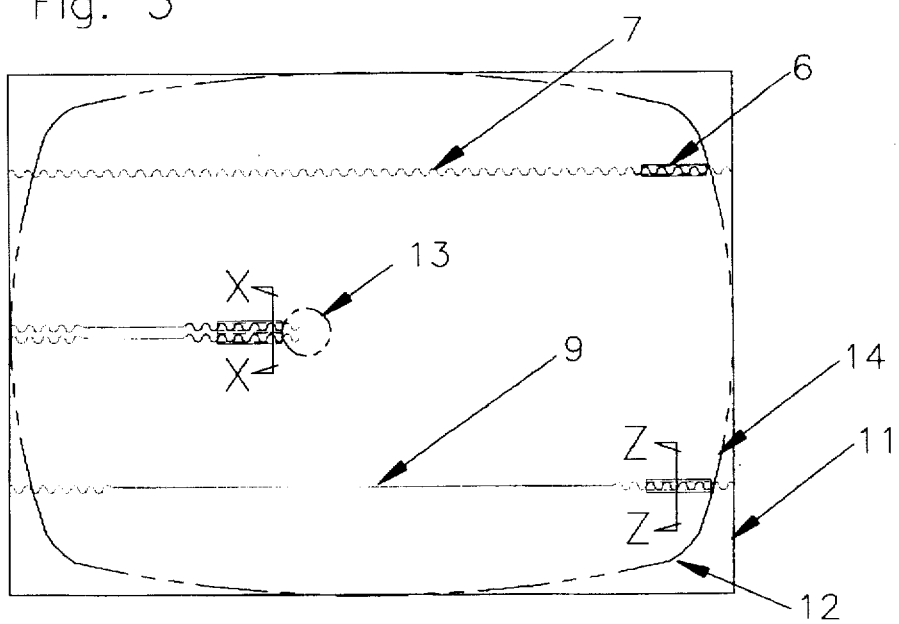
FIG. 3 is a top elevational view of a laminate formed from the components shown in FIG. 1.

After the various wires and layers of material are positioned as shown in FIG. 1, the various components are laminated to one another in a conventional manner into a rectangularly shaped laminate 11 as shown in FIG. 3. Oftentimes, laminate 14 is not plainer after being formed, as shown, since the panels often have three dimensional shape requirements, such as for use in a motor vehicle headliner. After the laminate 11 is formed, it is cut into a shaped laminated panel 12 in a manner well known in the art, such as by the use of water knives or the like. In this example, shaped laminated panel 12 is for use as a motor vehicle headliner such that the corners of rectangularly shaped laminate 11 are cut away to reveal an edge boundary 14 having a particular shape for a certain vehicle application. At the same time, a circular opening 13 is cut in the panel for later attachment of an electrical item, such as a dome light. In accordance with the present invention, the circuitous pattern portion of each wire is positioned so as to be adjacent cut edge boundary 14, and/or the edge boundary defined by opening 13 after being cut into a shaped laminated panel 12 as shown in shadow in FIG. 3. In this case, wires 7 and 9 are uninsulated and intended for use as an antenna, whereas the shorter wires are intended to provide power to a dome light.

Figure 4:
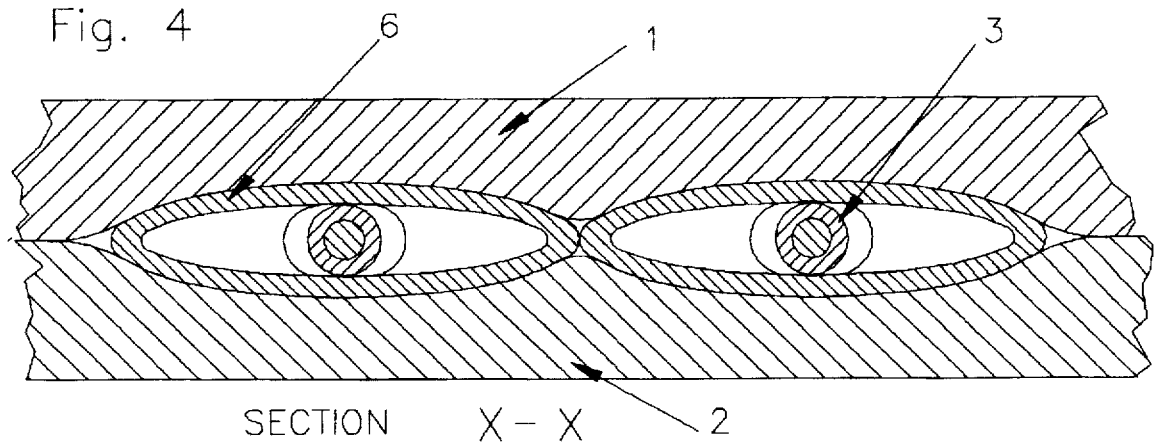
FIG. 4 is a partial sectioned side elevational view of a laminated panel according to the present invention taken along section lines x—x of FIG. 3.
Figure 5:
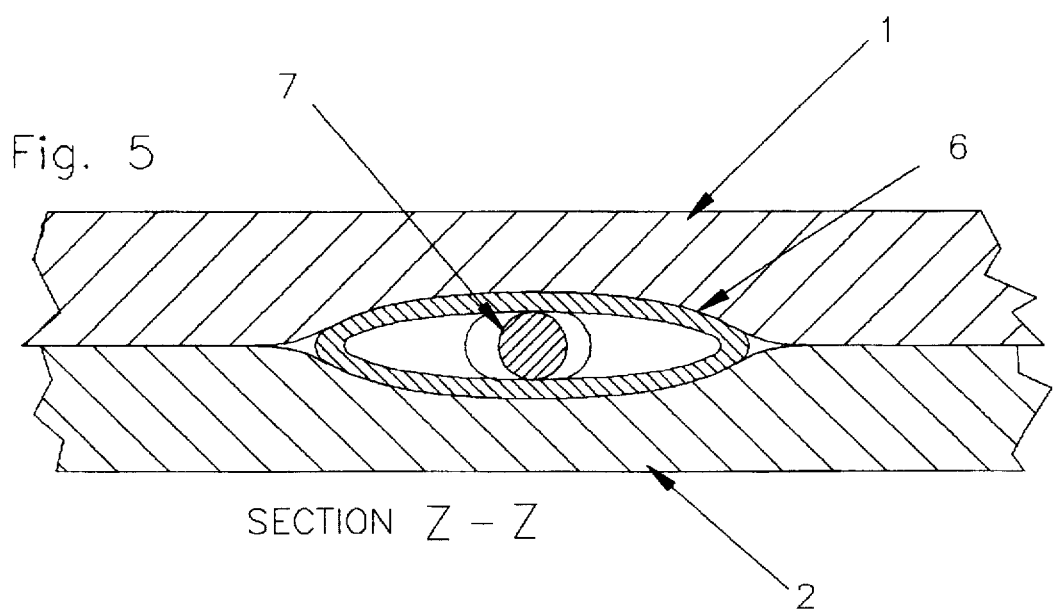
FIG. 5 is a partial sectioned side elevational view of the laminate of FIG. 3 taken along section line z—z.
Figure 6:
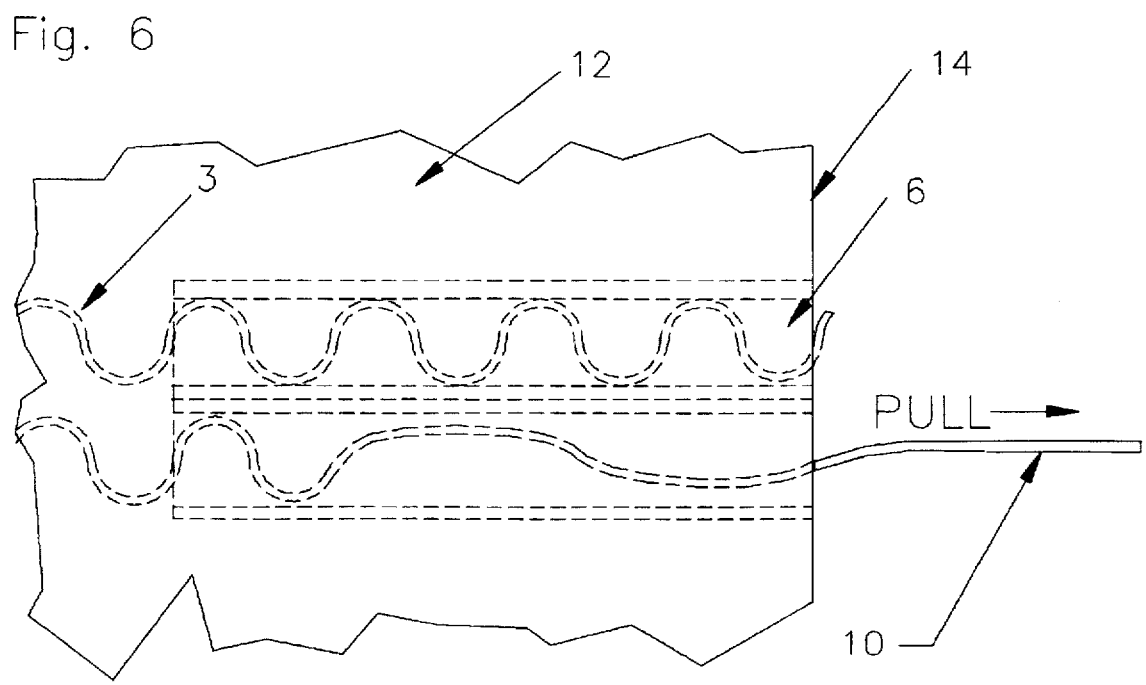
FIG. 6 is a partial top elevational view of a laminated panel according to one aspect of the present invention.

After being cut to shape, the circuitous portion of each wire segment adjacent edge boundary 14 can be pulled away from the edge boundary as shown in FIG. 6 to reveal an electrical lead 10. Electrical lead 10 can then be attached to a power source or an electrical component in a manner well known in the art. While the use of sleeves 6 is sometime preferred in order to insure that a portion of the wire can be pulled away from the edge of the shaped laminated panel 12, sleeves are not necessary to the invention. In other words, a portion of the wire can be deformed and pulled away from the boundary edge of the laminate without the use of a sleeve and without significantly undermining the laminated integrity of the panel. FIGS. 4 and 5 show that although sleeves 6 and layers of material 1 and 2 are attached to one another, the wire segments 3 remain unattached and capable of being deformed or undeformed as shown in FIG. 6 to reveal an electrical lead 10 adjacent the edge boundary 14 of the shaped laminated panel 12.

The present invention is suitable for, but not limited to, use with panel materials such as fiberglass, fiberboard, molded polymeric materials and any of the other wide variety of materials known to those skilled in the art making of laminated panels. By placing wire between the layers of a panel and including a portion of the wire formed into a circuitous pattern, the panels can be molded, cut to size and a portion of the excess captured wire can be extracted along the edge of the panel later. The important aspect being the provision of excess wire in the panel, which may be in the form of a regular repeating pattern or any other suitable pattern that allows a portion of the wire to be pulled free and exposed along the edge boundary of the cut panel. With certain panel compositions, a sleeving may be employed around the wire ends to insure that the wire does not bind to the panel material permanently during the lamination process. It should be also noted that only a relatively small portion of the wire need be formed into a circuitous pattern since only a small amount of wire is necessary in order to create an electrical lead. Thus, as shown in FIG. 1, some of the wires include a relatively elongated portion 5 that remains undeformed.

It should be understood that the above description is intended for illustrative purposes only and is not intended to limit the scope of the present invention in any way. The true scope of the present invention should be determined solely in terms of the claims as set forth below.

I claim:

1. A laminated panel with an embedded wiring harness comprising:

a length of wire with a portion deformed into a circuitous pattern;

a plurality of layers of material;

said length of wire being positioned between two of said plurality of layers of material;

said plurality of layers of material being laminated together into a laminate and cut to include an edge boundary; and said portion deformed into a circuitous pattern being exposed at said edge boundary and being capable of further deformation to extend a segment of said length of wire away from said edge boundary.

2. The laminated panel of claim 1 wherein said portion deformed into a circuitous pattern is at least partially surrounded by a sleeve exposed at said edge boundary.

3. The laminated panel of claim 1 wherein said circuitous pattern is a regular repeating pattern.

4. The laminated panel of claim 3 wherein said regular repeating pattern is a wave pattern that is free of overlapping wire segments.

* * * * *